(12) United States Patent
Idlas

(10) Patent No.: US 6,869,686 B1
(45) Date of Patent: Mar. 22, 2005

(54) IRRADIATED BIAXIALLY ORIENTED FILM

(75) Inventor: Scott A. Idlas, Downers Grove, IL (US)

(73) Assignee: Curwood, Inc., Oshkosh, WI (US)

( * ) Notice: Subject to any disclaimer, the term of this patent is extended or adjusted under 35 U.S.C. 154(b) by 0 days.

(21) Appl. No.: 09/652,591

(22) Filed: Aug. 30, 2000

(51) Int. Cl.$^7$ .............................................. B32B 27/08
(52) U.S. Cl. ...................... 428/516; 428/34.9; 428/35.2; 428/35.4; 428/36.7; 428/515; 428/518; 428/520; 428/910
(58) Field of Search .................. 428/518, 35.4, 428/34.9, 515, 910, 35.2, 36.7, 516, 514, 520

(56) References Cited

U.S. PATENT DOCUMENTS

| | | | |
|---|---|---|---|
| 4,469,742 A | 9/1984 | Oberle et al. ............... | 428/215 |
| 4,863,769 A * | 9/1989 | Lustig et al. ............... | 428/349 |
| 4,888,223 A | 12/1989 | Sugimoto et al. .......... | 428/34.9 |
| 5,382,470 A | 1/1995 | Vicik .......................... | 428/334 |
| 5,468,440 A | 11/1995 | McAlpin et al. ............ | 264/291 |
| 5,571,619 A | 11/1996 | McAlpin et al. ............ | 428/364 |
| 5,741,563 A | 4/1998 | Mehta et al. ............... | 428/35.1 |
| 5,747,592 A | 5/1998 | Huff et al. .................. | 525/191 |
| 5,759,648 A | 6/1998 | Idlas ........................... | 428/34.9 |
| 5,928,740 A | 7/1999 | Wilhoit et al. ............. | 428/34.9 |
| 6,063,462 A * | 5/2000 | Tsukamoto et al. ........ | 425/36.7 |
| 6,063,482 A | 5/2000 | Peiffer et al. ............... | 428/213 |
| 6,071,598 A | 6/2000 | Peiffer et al. ............... | 428/213 |
| 6,074,715 A | 6/2000 | Lind et al. .................. | 428/35.4 |
| 6,437,064 B1 | 8/2002 | Eckstein et al. ............ | 526/160 |

FOREIGN PATENT DOCUMENTS

| | | |
|---|---|---|
| EP | 0 561 428 B1 | 4/1994 |
| EP | 0 668 157 A1 | 8/1995 |
| EP | 0 816 069 A2 | 1/1998 |
| EP | 0 905 173 A1 | 3/1999 |
| EP | 0 992 339 A2 | 4/2000 |
| EP | 1 000 973 A1 | 5/2000 |
| EP | 1 006 149 A1 | 6/2000 |
| WO | WO 95/32235 | 11/1995 |
| WO | WO 99/67094 | 12/1999 |

OTHER PUBLICATIONS

McAlpin, et al., "Potential BOPP and Cast Film Applications of Metallocene–Based Propylene Polymers from Exxpol® Catalysis," SPO '96 Proceedings, pp. 429–448 (1996).
Campbell, et al., "CEFOR™ Propylene–Butene Random Copolymers for Cast and Oriented Film Applications," Polyolefins IX Proceedings, pp. 227–245 (1994).
Patent Abstracts, WO 95/32235 (1995).
Patent Abstracts, WO 95/32242 (1995).

* cited by examiner

Primary Examiner—Monique R. Jackson
(74) Attorney, Agent, or Firm—Brinks Hofer Gilson & Lione

(57) ABSTRACT

A multi-layer packaging film is provided having at least four layers arranged in sequence comprising: (1) a heat-sealing first layer comprising at least 50% by weight of a copolymer of propene, and at least one α-olefin selected from the group consisting of ethylene, butene-1, methylpentene-1, hexene-1, octene-1, decene-1 and mixtures thereof, said copolymer having a propene content of at least 60 wt. %, a Tm between about 100° C. and about 145° C., a Mw/Mn of between 1 and 5, and n-hexane extractables of less than 4 wt. %; (2) second and fourth layers each comprising (a) at least 10 wt. % of a first copolymer of ethylene and at least one $C_4$–$C_8$ α-olefin, said copolymer having a density of from 0.900 to 0.915 g/cm$^3$ and a melt index of less than 2 dg/min., (b) at least 10 wt. % of a second copolymer of ethylene with from 4 to 18 wt. % of a vinyl ester, alkyl acrylate, acrylic or methacrylic acid, and (c) from 0 to 60 wt. % of a third copolymer of ethylene and at least one $C_3$–$C_8$ α-olefin having a density less than 0.900 g/cm$^3$ and a melting point less of between 65–98° C.; and (3) a third layer comprising at least 80% by weight of at least one copolymer of vinylidene chloride with from 2–20 wt. % (based on said copolymer) of vinyl chloride or methyl acrylate.

97 Claims, No Drawings

IRRADIATED BIAXIALLY ORIENTED FILM

BACKGROUND OF THE INVENTION

The present invention relates to improvements in the art of packaging foodstuffs, especially cook-in foods such as for example ham, beef, and turkey breasts.

Manufacturers and wholesalers use flexible thermoplastic packaging films to provide economical, sanitary containers, which help protect and/or preserve the freshness and wholesomeness of their products. These films are often sold in bag form. For example, a single or multilayer film is made into bags using a tubular film or one or more flat sheets or webs of film by well known processes involving e.g. cutting, folding and/or sealing the film to form bags. These films and bags may be printed and may also be uniaxially or biaxially oriented, heat shrinkable, irradiated, or may contain film layers which are abuse resistant or puncture resistant or which are crosslinked or which enhance or retard or prevent transmission of light, gases, or liquids therethrough. Frequently, multilayer films having one or more barrier layers to oxygen and/or moisture such as: Saran (a polyvinylidene chloride copolymer); a modified saran e.g. MA-Saran containing methyl acrylate polymer units; ethylene vinyl alcohol copolymer; nylon; or acrylonitrile may be used with a heat sealing layer such as a copolymer of ethylene and vinyl acetate (EVA) to produce bags for packaging oxygen and/or moisture sensitive foods e.g. processed pork or fresh red meat. Such bags help preserve meat in its original condition by preventing or reducing moisture loss and chemical changes in the meat structure due to oxidation reactions.

A typical packaging bag has three sides heat sealed by the bag manufacturer leaving one open side to allow product insertion. For example, a processor may insert fresh, frozen or processed meat, ham, poultry, cheese, primal or subprimal meat cuts, ground beef, fruits, vegetables, bread or other products making a final seal to hermetically enclose the product in the bag. This final seal may follow gas evacuation (i.e. vacuum removal) or replacement of the gaseous environment within the bag by one or more gases to provide some advantage such as to assist product preservation. This final seal is frequently a heat seal similar to the initial seals produced by the bag manufacturer although the actual heat sealing equipment may vary.

Thus, bags are made: by transversely sealing tubular stock of monolayer or multilayer film and cutting off the tube portion containing the sealed end; by making two spaced apart transverse seals on tubular stock and cutting open the side of the tube; by superimposing flat sheets of film and sealing on three sides; or by folding a flat sheet and sealing two sides.

Generally, heat seals are made by applying sufficient heat and pressure to adjacent film layer surfaces for a sufficient time to cause a fusion bond between the plastic film layers.

A common type of seal used in manufacturing bags is known to those skilled in the art as a hot bar seal. In making a hot bar seal, adjacent thermoplastic layers are held together by opposing bars of which at least one is heated to cause the layers to fusion bond by application of heat and pressure across the area to be sealed. For example, bags may be made from a tube stock by making one hot bar bottom seal transverse to a tubular film. Once the bottom seal is made, the tube stock is transversely cut to form the mouth of the bag.

After a product is inserted, the bag is typically evacuated and the bag mouth sealed to enclose the product. At one time, the standard method for sealing was to fasten a clip around the mouth of the bag. However, heat sealing techniques are now also commonly employed to produce the final closure of the bag. For example, a bag mouth may be either hot bar sealed or impulse sealed. An impulse seal is made by application of heat and pressure using opposing bars similar to the hot bar seal except that at least one of these bars has a covered wire or ribbon through which electric current is passed for a very brief time period (hence the name "impulse") to cause the adjacent film layers to fusion bond. Following the impulse of heat the bars are typically cooled (e.g. by circulating coolant) while continuing to hold the bag inner surfaces together to achieve adequate sealing strength.

Relative to hot bar seals, impulse seals may be made faster because of the quick cool down of the ribbon following the heat impulse. Impulse seals are also generally narrower giving an improved package appearance, but narrower seals also leave less margin for error in the production of continuous sealed edges. Less area is usually bonded in an impulse seal relative to a hot bar seal, thus the performance of the film's sealing layer is more critical.

Disadvantageously, the film in the seal area often becomes extruded during impulse sealing of known films. This results in thinning of the film and a reduction of film strength in the seal area. In extreme situations, the thinned film is severed or pulled apart. Those skilled in the art refer to severely extruded seals to as "burn through" seals. A "burn through" seal does not have adequate strength or integrity to protect the packaged product. One attempt to solve this "burn through" problem is to irradiate the film prior to manufacture of the bag.

Irradiation of a film made from cross-linkable polymer resins causes resin layers in the film to crosslink. Under controlled conditions, crosslinking by irradiation raises and may also broaden the temperature range for heat sealing, and depending upon the film composition may also enhance puncture resistance of the film. If the heat sealing layer of the thermoplastic film is crosslinked too heavily, it is more difficult to fusion bond which makes achieving strong seals difficult, particularly by impulse sealing. All bag seals must maintain their integrity to preserve and protect enclosed products, especially food products.

There must be a strong continuous seal to prevent unwanted egress and ingress of gaseous, liquid or solid materials between the bag exterior and interior. This is particularly, necessary when the package is made of heat shrinkable film and is to be immersed in hot water to shrink the film against the packaged article since such shrinkage increases the stress on these seals. It is even more critical where the packages are to be immersed at sufficient times and temperatures for pasteurization or cooking. Thus, there is a continuing need for films which can be made into bags having strong seals especially those formed by hot bar and/or impulse sealing. Such films should provide strong seals able to withstand a range of temperatures and also be able to make such seals over a wide sealing temperature range without burn through.

Variations in sealing temperatures, times and pressure are known to exist from one brand or type of sealer to another and also between different sealing machines sold under the same brand. This increases the desirability for films that may be usefully sealed on different sealing machines and over a wide range of temperatures to produce strong integral seals.

Another heat sealing problem is that of inadvertent folding. Normally, a heat seal is made by applying heat and pressure across two portions of film. But occasionally, the area to be sealed will be inadvertently folded to produce a section of film having four or six film portions that are pressed between the opposing sealer bars. In such situations, it is desirable to be able to seal the film without burn through. A wider impulse heat sealing temperature range is indicative of a greater latitude in sealing through folds than a narrower range.

Another problem during heat sealing is that of excessively high tear propagation strengths. Lower tear propagation strengths are an advantage in heat sealing operations using impulse sealing technology where the sealing apparatus both seals and cuts the film with the film trim being removed by tearing along the cut. Low tear propagation strengths enable quick trim removal without damage to the seal, film or bag.

A very demanding application for heat shrinkable, heat sealable thermoplastic flexible films is for processing meats. Bacterial contamination during food processing e.g. by *Listeria monocytogenes* is of great concern. To address health and safety concerns with processed foods, some processors have adopted a surface heat treatment at elevated temperatures sufficient to kill bacteria on already cooked food.

In some demanding applications, a food product such as a ham is sealed inside a plastic processing bag or film in which the ham is cooked, refrigerated, shipped and subsequently displayed for retail sale.

In a more common demanding application, food such as a turkey breast, ham, or beef is cooked in a pan, net, or processing film from which the cooked food is removed for further processing such as: slicing; smoking in a smokehouse; treatment with colorants and/or flavorants such as caramel, spices, liquid smoke or honey; glazing; and/or removal of liquid (known as purge) resulting from e.g. the cooking process. Following this further processing, the food product is packaged, often in a printed bag, for shipment and sale. The cooked food is typically placed into a heat sealable, heat shrinkable bag which is then emptied of atmospheric gases by vacuum, heat sealed and subjected to a film shrinking operation usually in a water tank at elevated temperature for a brief period of time to produce a compact attractive package. During these steps that follow cooking and occur prior to packaging for shipment and sale, the food product surface is subject to environmental contamination, for example, by airborne particles, microbes, and, dust. The risk from contamination after packaging may be minimized by surface pasteurizing the encased sealed package e.g. in a water bath or steam chamber held at elevated temperatures for a time sufficient to provide the desired degree of protection from microbial contamination and growth. The time and temperatures of this post-cooking pasteurization step may vary widely.

Significantly this surface treatment is in addition to the cooking or pasteurization process and follows hermetically sealing the cooked or pasteurized food in a plastic packaging film. In this demanding use, this "post-cooking pasteurization" surface treatment is performed after placing the food into the packaging film that will remain on the pasteurized product through sale to an ultimate customer. Often the films are printed with consumer information and brand identification and frequently at least a portion of the film is clear to allow viewing of the enclosed product. Therefore, optical properties and film appearance are important for consumer appeal and sale.

This "post-pasteurization" film must perform a variety of functions well. It must be puncture resistant and have strong seals at the elevated temperatures encountered in the shrinking operation, and also with the post-cooking pasteurization process. It should also keep tight conformation of the film around the product at refrigeration temperatures with an attractive appearance and act as a good barrier to oxygen, moisture and environmental contaminates.

Past attempts at providing improved puncture resistance and heat sealing in films, while making some progress, still leave room for improvement. Variability in heat sealing equipment and process parameters continue to produce bags with weak seals which are subject to tearing and stress on the seals during cutting operations, which are subject to burn through, which fail to seal through folds, and which produce leaking bags having discontinuous seals and which are not sufficiently resistant to punctures. It would be highly desirable to have biaxially stretched, heat shrinkable films and bags which are highly puncture resistant and/or whose heat sealing layer in particular and film construction in general allows greater flexibility and variability in heat sealing process parameters while producing strong, integral, continuous seals rapidly and with a lower failure rate relative to prior art films and bags.

Accordingly, one object of the present invention is to provide a novel film structure having an improved combination of properties.

BRIEF SUMMARY OF THE INVENTION

In a first embodiment of the invention, a multi-layer packaging film is provided having at least four layers arranged in sequence comprising: (1) a heat-sealing first layer comprising at least 50% by weight of a copolymer of propene, and at least one α-olefin selected from the group consisting of ethylene, butene-1, methylpentene-1, hexene-1, octene-1, decene-1 and mixtures thereof, said copolymer having a propene content of at least 60 wt. %, a Tm between about 100° C. and about 145° C., a Mw/Mn of between 1 and 5 and n-hexane extractables of less than 5 wt. %; (2) second and fourth layers each comprising (a) at least 10 wt. % of a first copolymer of ethylene and at least one $C_4$–$C_8$ α-olefin, said copolymer having a density of from 0.900 to 0.915 g/cm$^3$ and a melt index of less than 2 dg/min., (b) at least 10 wt. % of a second copolymer of ethylene with from 4 to 18 wt. % of a vinyl ester, alkyl acrylate, acrylic or methacrylic acid, and (c) from 0 to 60 wt. % of a third copolymer of ethylene and at least one $C_3$–$C_8$ α-olefin having a density less than 0.900 g/cm$^3$ and a melting point less of between 65–98° C.; and (3) a third layer comprising at least 80% by weight of at least one copolymer of vinylidene chloride with from 2–20 wt. % (based on said copolymer) of vinyl chloride or methyl acrylate.

In a second embodiment of the invention, there is provided a multi-layer biaxially oriented heat-shrinkable packaging film comprising: (1) a heat-sealing first layer comprising at least 50% by weight of a copolymer of propene, and at least one α-olefin selected from the group consisting of ethylene, butene-1, methylpentene-1, hexene-1, octene-1, decene-1 and mixtures thereof, said copolymer having a propene content of at least 60 wt. %, a Tm between about 100° C. and about 145° C., a Mw/Mn of between 1 and 5, and n-hexane extractables of less than 5 wt. %; (2) a second layer comprising (a) at least 10 wt. % of a first copolymer of ethylene and at least one $C_4$–$C_8$ α-olefin, said copolymer having a density of from 0.900 to 0.915 g/cm$^3$ and a melt index of less than 2 dg/min., (b) at least 10 wt. % of a second copolymer of ethylene with from 4 to 18 wt. % of a vinyl ester, alkyl acrylate, acrylic or methacrylic acid, and (c) from 0 to 60 wt. % of a third copolymer of ethylene and at least one $C_3$–$C_8$ α-olefin having a density less than 0.900 g/cm$^3$ and a melting point less of between 65–98° C.; and (3) a transition layer between and in contact with said first layer and said second layer, the transition layer comprising (a) at least 20% by weight of a fourth copolymer of propene, and at least one α-olefin selected from the group consisting of ethylene, butene-1, methylpentene-1, hexene-1, octene-1, decene-1 and mixtures thereof, said copolymer having a propene content of at least 60 wt. %, a Tm between 100° C. and 145° C., a Mw/Mn of between 1 and 5, and n-hexane extractables of less than 5 wt. %, (b) at least 20% by weight of a fifth copolymer of ethylene and at least one $C_4$–$C_8$ α-olefin, said copolymer having a density of from 0.900 to 0.915 g/cm$^3$ and a melt index of less than 2 dg/min., and (c) from 0 to 60 wt. % of a sixth copolymer of ethylene and at least one $C_3$–$C_8$ α-olefin having a density less than 0.900 g/cm$^3$ and a melting point less of between 65–98° C.

In a third embodiment of the invention, a multi-layer packaging film formable into a pouch by heat sealing for use in food preparation is provided consisting essentially of: (1) a heat-sealing inner layer comprising at least 50% by weight of a copolymer of propene, and at least one α-olefin selected from the group consisting of ethylene, butene-1, methylpentene-1, hexene-1, octene-1, decene-1 and mixtures thereof, said copolymer having a propene content of at least 60 wt. %, a Tm between about 100° C. and about 145° C., a Mw/Mn of between 1 and 5, and n-hexane extractables of less than 5 wt. %, (2) a second layer in contact with the inner sealing layer comprising (a) at least 10 wt. % of a first copolymer of ethylene and at least one $C_4$–$C_8$ α-olefin, said copolymer having a density of from 0.900 to 0.915 g/cm$^3$ and a melt index of less than 2 dg/min., (b) at least 10 wt. % of a second copolymer of ethylene with from 4 to 18 wt. % of a vinyl ester, alkyl acrylate, acrylic or methacrylic acid, and (c) from 0 to 60 wt. % of a fourth copolymer of ethylene and at least one $C_3$–$C_8$ α-olefin having a density less than 0.900 g/cm 3 and a melting point less of between 65–98° C.; and (3) an optional third layer comprising a protective outer layer.

The films of the present invention are useful to process and/or package articles, especially foodstuffs such as ham, beef, poultry, or processed meat, which may be cooked in the film. The embodiments of the invention have numerous advantages. The film has reduced extractables, which means better compliance with FDA regulations and more usefulness for meat adhesion, reduced seal initiation temperatures for better heat sealing and reduced "burn through," more resistance to degradation of physical properties upon irradiation. These and other advantages will be more apparent from the detailed description of the preferred embodiments that follows.

DETAILED DESCRIPTION OF THE PREFERRED EMBODIMENTS OF THE INVENTION

In discussing plastic film packaging, various polymer acronyms are used herein and they are listed below. Also, in referring to blends of polymers a colon (:) will be used to indicate that the components to the left and right of the colon are blended. In referring to film structure, a slash "/" will be used to indicate that components to the left and right of the slash are in different layers and the relative position of components in layers may be so indicated by use of the slash to indicate film layer boundaries. Acronyms commonly employed herein include:

EAA —Copolymer of ethylene with acrylic acid
EVA —Copolymer of ethylene with vinyl acetate
EVOH —A saponified or hydrolyzed copolymer of ethylene and vinyl acetate
MA Saran —methyl acrylate and vinylidene chloride
PE —Polyethylene (an ethylene homopolymer and/or copolymer of a major portion of ethylene with one or more α-olefins)
PP —Polypropylene homopolymer
PVDC —Polyvinylidene chloride (also includes copolymers of vinylidene chloride, especially with vinyl chloride), also referred to as Saran.

In contrast to prior art films using Ziegler-Natta (ZN) catalyzed propylene copolymers, the present invention uses metallocene catalyzed propylene copolymers in the first layer. ZN catalyzed propylene copolymers, while useful as sealing layers of irradiated or corona treated film structures, have some limitations. If the ZN catalyzed polypropylene have enough comonomer to have a low seal initiation temperature (i.e., a temperature approaching that of ethylene copolymers), they tend to have high extractables, which can adulterate the food product being packaged. In contrast, metallocene catalyzed propylene has low extractables.

ZN catalyzed propylene that have low extractables tend to have low shrinkage after being subjected to biaxial orientation. This can significantly reduce the shrinkage of a coextruded structure having a ZN catalyzed propylene copolymer later. In contrast, metallocene catalyzed propylene copolymers promise to have improved shrink properties.

Accordingly, a film with a metallocene catalyzed propylene copolymer that has a low seal initiation temperature and high shrink in combination with a cross-linkable layer to give the film burn through resistance will have a broad sealing window compared to prior art films, and improved shrink compared to prior art films.

The invention utilizes a multilayer thermoplastic polymeric flexible film of 10 mils (254 microns) or less having a metallocene catalyzed propene-based copolymer layer for food contact which provides heat sealability, an MA-Saran gas barrier layer, an outer abuse resistant layer, and intermediate layers which utilize a combination of high molecular weight, low molecular weight, highly branched and substantially linear polymers to produce an orientable film having high delamination resistance even under cook-in conditions. The MA-Saran containing layer controls the gas permeability of the film. The metallocene catalyzed propene-based copolymer containing layer controls the adherability of the film to an enclosed food, which for meat is termed "meat adhesion," and also controls heat sealability and seal strength, particularly at elevated temperatures and over time. The intermediate layers control delamination resistance to the MA- Saran core layer, and beneficially enhance orientability.

Such films will preferably have a thickness of about 2–3 mils (50.8–76.2 microns), although suitable films for packaging foodstuffs as thick as 4 mils (101.6 microns) or as thin as 1 mil (25.4 microns) may be made. Typically, films will be between about 1.5–3 mil (38.1–76.2 microns). Especially preferred for use as films for packaging cook-in meats are films where the multilayer film has a thickness of between about 2 to 3 mils (50.8–76.2 microns). Such films have good abuse resistance and machinability. Films thinner than 2 mils are less abuse resistant and more difficult to handle in packaging processes. Advantageously, preferred films are heat shrinkable. Preferred films may also provide a beneficial combination of one or more or all of the properties including low haze, high gloss, high shrinkage values at 90° C. or less, good machinability, good mechanical strength and good barrier properties including high barriers to oxygen and water permeability.

The inventive film, bag, process and package of the present invention may be used as a heat sealable, oxygen and moisture barrier film for holding a foodstuff during cooking and/or for packaging for sale of such a foodstuff after a pasteurization or cooking period.

The present invention is particularly well adapted to processing and packaging pasteurizable foods, and has particular utility in packaging cook-in harris. "Cook-in" is the term used to indicate a film or bag in which a foodstuff is pasteurized or cooked. This film or bag is used to hold together, protect and/or form the shape of the foodstuff by a food processor (manufacturer) during the cooking or pasteurization process after which the film may be removed (sometimes termed "stripped"), or may be left on as a protective barrier during shipping, and optionally even left on during retail sale.

Some of the other benefits of the inventive film include: relatively low permeability to oxygen and water vapor; high delamination resistance and an unexpectedly good combination of delamination resistance especially at elevated temperatures simulating cook-in conditions and orientability resulting in good low temperature heat shrinkability; resistance to degradation by food acids, salts and fat; high shrinkage values at low temperatures (90° C. or lower); residual shrink force which forms and maintains a compact product; controllable meat adhesion; good to excellent heat sealability especially over a broad voltage range on commercial sealers; low levels of extractables with compliance with governmental regulations for food contact; low haze; high gloss; does not impart off tastes or odors to packaged food; good tensile strength; a surface which is printable; high heat seal strength and a long lasting seal especially at cook-in temperatures; and good machinability.

Advantageously, a preferred embodiment of the invention has low $O_2$ and low water vapor permeabilities in combination with high meat adhesion which prevents undesirable cook-out of liquid during processing, good heat sealability and high low temperature (90° C. or less) shrinkage values. In an especially preferred embodiment, the inventive film has at least 20% (more preferably about 30% or higher) shrinkage values in at least one direction at 90° C. or less, and preferably at least 25% in both directions. Also, preferred films are heat sealable over a broad voltage range, and preferably heat shrinkable at low temperatures in combination with such broad range heat sealability.

Also, the oxygen barrier properties of the inventive film reduces or eliminates losses from spoilage e.g. by rancidity due to oxidation. The inventive films and bags are particularly useful for packaging cook-in foodstuffs, but may also be employed as packaging for a wide variety of food and non-food articles.

The present invention may be employed as bags in the various typical sizes. By "flatwidth" is meant the transverse width of a flattened tubular film. The flatwidth is also equal to ½ of the circumference of the tubular film.

One embodiment of the invention is preferably a heat shrinkable multilayer film that must have at least four layers. These four layers are termed the first layer, the second layer, the third layer, and the fourth layer. The first layer and fourth layer are disposed on opposing sides of the third layer. The first layer is preferably attached thereto by the second intermediate layer. When the film is in tube or bag form these layers comprise the wall of the tube or bag. This wall in cross-section has the first layer comprising an outer layer disposed closest to the tube's (or bag's) interior surface with the fourth layer being an opposing outer layer typically disposed closest to the tube's (or bag's) exterior surface.

It is contemplated according to the present invention that tubular films having more than four layers may be constructed. Such additional layers may be disposed as additional intermediate layers lying between the third layer (also called the core layer) and the first layer, or these additional layers may comprise one or more surface layers and comprise either or both the interior or exterior surface of the tube. Also, so-called transition layers may be provided that increase the adherence between the first layer and intermediate layers. Preferably, the first layer will comprise the interior surface layer of the tube where in use it will contact a foodstuff encased by the tube.

Beneficially, this first layer will be heat sealable to facilitate formation of bags and hermetically sealed packages. Advantageously, the first layer as the interior surface layer will, when used to package foodstuffs, be suitable for contact with foodstuffs containing protein, water and fat without evolving or imparting harmful materials; off tastes or odors to the foodstuff. Beneficially, the first layer may be the interior surface layer and may consist essentially of a propene α-olefin copolymer. If desired, an ionomeric resin may be used either alone or blended in one or more of the layers but such use is unnecessary to produce a film suitable for packaging cook-in foodstuffs. Advantageously, the heat sealing layer and indeed the entire film may be free of ionomer polymer yet provide entirely satisfactory performance without the added expense of using costly ionomer resin.

Also, it is preferred that the fourth layer will comprise the exterior surface of the tube or bag. As the exterior surface layer of the tube or bag, the fourth layer should be resistant to abrasions, abuse and stresses caused by handling and it should further be easy to machine (i.e. be easy to feed through and be manipulated by machines e.g. for conveying, packaging, printing or as part of the film or bag, manufacturing process). It should also facilitate stretch orientation where a high shrinkage film is desired, particularly at low temperatures such as 90° C. and lower.

Advantageously, the first layer will be predominantly comprised of propylene copolymers having a propylene (propene) content of 60 wt. % or more. Such layer is preferably an interior surface layer of the tube or bag.

The surface layers function to protect the core layer from abuse and may, also protect it from contact with moisture which may impact or alter the gas barrier properties of the core layer.

Beneficially, in the present invention there are intermediate layers on either side of the MA-Saran core layer (third layer). The second layer of this film is generally an unusually thick intermediate layer which in addition to providing delamination resistance between the adjacent MA-Saran layer and the opposing layer, also contributes to ease of orientation and facilitates formation of a biaxially stretched film having high shrinkage values particularly at low temperatures (90° C. or lower) in combination with optical properties which are superior to many prior art films. Use of an intermediate layer directly adhered to either side of the core layer produces a film which is extremely resistant to delamination and which may be oriented to produce film having high shrinkage of 30% or higher at 90° C. or less.

In a preferred embodiment, the MA-Saran core layer directly adheres to the second and fourth layers, which function as intermediate layers and in turn are optionally directly adhered respectively to either (or preferably both) the interior (first) and an optional exterior (fifth) layers. In a most preferred embodiment, the film article consists essentially of four polymeric layers: the interior (first) layer, the intermediate (second) layer, the core (third) layer, and the exterior (fourth) layer. This preferred embodiment provides a desirable combination of properties such as low moisture permeability, low $O_2$ permeability, controllable meat adhesion, high gloss, good mechanical strength, chlorine-free construction, and desirable shrink forces in a low temperature heat shrinkable, multilayer packaging film which is delamination resistant, heat sealable and which can be biaxially oriented. The core layer may optionally have processing aids or plasticizers.

Typical layer thicknesses for the essential layers of the first embodiment of the inventive heat shrinkable film may be about 5–40% first (typically interior pg surface) layer, 25–70% second (intermediate) layer, 3–13% third (core) layer, and 10–50% fourth (exterior) layer, although films with differing layer ratio thicknesses are possible. In the second embodiment of the invention, the transition layer between the first and second layers may be about 2–10% of the total film thickness.

The first layer is typically an outer surface layer of the film and in a tubular construction is the interior surface layer of the tube. The function of the first layer is to provide a surface that has controllable meat adhesion and which is heat sealable to itself (or to the second outer layer if a lap seal is desired) on commercially available equipment and (for food packaging) to provide a hygienic surface for contact with the foodstuff. In the present invention, to fulfill these functions the thickness of the first layer need not be great, but for an advantageous combination of ease of processing and seal performance this layer will preferably be from 0.1–1.2 mils thick. It is important that this heat sealable layer be continuous, e.g. over the interior surface of the tube, and that it be extruded at a sufficient thickness to allow heat sealing (if desired).

Preferably, the first layer is an interior surface heat sealing layer which allows the film to be formed into bags. By the term "heat sealing layer" is meant a layer which is heat sealable to itself, i.e., capable of fusion bonding by conventional indirect heating means which generate sufficient heat on at least one film contact surface for conduction to the contiguous film contact surface and formation of a bond interface therebetween without loss of the film integrity. Advantageously, the bond interface must be sufficiently thermally stable to prevent gas or liquid leakage therethrough when exposed to above or below ambient temperatures during processing of food within the tube when sealed at both ends, i.e., in a sealed bag form. For use in cook-in applications the heat seals should withstand elevated temperatures up to about 160–180° F. (71–82° C.) or higher for extended periods of time e.g. up to 4 to 12 hours in environments which may range from heated humidified air or steam to submersion in heated water. Finally, the bond interface between contiguous inner layers must have sufficient physical strength to withstand the tension resulting from stretching or shrinking due to the presence of a food body sealed within the tube and optionally subjected to pasteurization or cook-in temperatures and conditions.

Unless otherwise indicated in the present application, percentages of materials used in individual layers are based upon the weight of the indicated layer. The percentage of comonomer content of a particular polymer is based upon the weight of the indicated polymer.

The first layer, especially as the interior surface layer of a tube according to the present invention, also provides good machinability and facilitates passage of the film over equipment (e.g. for inserting foodstuffs). This layer may be coated with an anti-block powder. Also, conventional antiblock additives, polymeric plasticizers, or slip agents may be added to the first outer layer of the film or it may be free from such added ingredients. When this layer is corona treated, optionally and preferably no slip agent will be used, but it will contain or be coated with an anti-block powder or agent such as silica or starch. In one embodiment of the invention the first outer layer consists essentially of a propene copolymer, or blends thereof.

Suitable propene copolymer resins for use in the first layer have a propene content of at least 60 weight percent, optionally at least 80 wt. %. Optionally and preferably, these copolymers will have a content of at least 90 wt. % propene. Copolymerized with propene will be at least one α-olefin selected from the group consisting of ethylene, butene-1, hexene-1, methylpentene-1, octene-1 and mixtures thereof in an amount up to 40 wt. %. Preferred are bipolymers of propene and ethene ($C_3$ $C_2$ copolymers), as well as $C_3$ $C_4$ bipolymers and $C_3$ $C_2$ $C_4$ terpolymers. Most preferred are $C_3$ $C_2$ copolymers, especially bipolymers. A preferred $C_3$ $C_2$ copolymer may have a propene content of at least 90% and optionally at least 95 wt. %.

The polypropylene copolymers used in the first layer of the present invention are generally produced using supported metallocene catalysts. The copolymers may be produced in many types of reactors or reaction schemes, including, but not limited to, fluidized bed or stirred bed gas phase reactors, slurry or bulk liquid reactors of tank or loop type or any other processes practiced for the polymerization of propylene, which are well-known in the art. A process for making such a metallocene catalyzed propylene copolymer is described in U.S. Pat. No. 5,571,619 to McAlpin et al., and is hereby incorporated by reference.

The preferred embodiments of the polypropylene copolymers are isotactic in nature due to the substantial amount of isotactic polypropylene used that is prepared by metallocene catalysts. The polypropylene is distinguished by particularly low n-hexane extractables, which is in general less than 5% by weight, preferably less than 4% by weight, more preferably less than 2.6% by weight, still more preferably is less than 2% by weight, and most preferably less than 1%, based in each case on the weight of the starting polymer, as determined by the procedure of 21 CFR 177.1520.

The molecular weight distribution is a further suitable parameter for characterizing the polymer structure. It is advantageously comparatively narrow. The ratio of the weight average molecular weight ($M_w$) to the number average molecular weight ($M_n$) is preferably less than 6, especially less than 5 and more preferably less than 4, as determined by gel permeation chromatography (GPC). The Mw/Mn ratio is more preferably less than 3, and most preferably in the range from 1.5 to 2.5.

The propylene copolymers preferably have a weight average molecular weight that is greater than about 140,000, preferably in the range of from about 140,000 to about 450,000, more preferably in the range from about 190,000 to about 400,000.

The copolymers preferably used in the first layer have in general a melt flow index of 0.5 to 30 dg/min., as measured by ASTM D-1238, condition L. More preferably, the melt flow index is in the range of from about 1 dg/min. to 10 dg/min.

The melting point is in the range from 100° C. to about 145° C., preferably in the range from about 110° C. to about 140° C., more preferably in the range from; about 110° C. to about 130° C., most preferably in the range from about 120° C. to about 130° C. The melting point depression is generally higher for the higher α-olefin comonomers incorporated into the polypropylene copolymer.

Thus, there are several physical properties that can distinguish ZN catalyzed propylene copolymers from metallocene catalyzed propylene copolymers. For example, even though the melt flow index for typical ZN catalyzed propylene copolymer (4 wt % $C_2$) compared with EXXPOL™ metallocene catalyzed propylene copolymer (3.4 wt % $C_2$) is reportedly about the same, 3.8 dg/min. vs. 4.0 dg/min., the melting temperature is reportedly much lower for the latter, 139° C. vs. 127° C., respectivley. Likewise, the hexane extractables are reportedly much lower for the latter copolymer, 3.0% vs. 1.4%, respectively.

Metallocene catalyzed propylene copolymers are commercially available from several sources, such as ACHIEVE™ or EXXPOL™ propylene, polymers, from Exxon Chemical Co., Houston, Tex., and Hostacen™ polymers from Hoechst AG, Germany.

Based on the above listed properties of metallocene catalyzed propylene copolymer, the first layer of the film of the present invention includes a metallocene catalyzed propylene copolymer defined as a copolymer of propene, and at least one α-olefin selected from the group consisting of ethylene, butene-1, methylpentene-1, hexene-1, octene-1, decene-1 and mixtures thereof, wherein the copolymer has a propene content of at least 60 wt. %, a Tm between 100° C. and 145° C., a Mw/Mn of between 1 and 5, and n-hexane extractables of less than 5 wt. %. Preferably, the copolymer of the first layer has at least those properties and (1) a Tm between 110° C. and 130° C., and a Mw/Mn of between 1 and 3, or (2) a Tm between 110° C. and 130° C., and n-hexane extractables of less than 2.6 wt. %, or (3) a Mw/Mn of between 1 and 3, and n-hexane extractables of less than 2.6 wt. %. More preferably, the copolymer of the first layer has a Tm between 110° C. and 130° C., a Mw/Mn of between 1 and 3, and n-hexane extractables of less than 2.6 wt. %. Even more preferably, the copolymer of the first layer has at least these preferred properties and a Tm between 120° C. and 130° C., or a Mw/Mn of between 1.5 and 2.5, or n-hexane extractables of less than 2 wt. %, or especially less than 1 wt. %. These preferred properties for the copolymer of the first layer are also applicable when the propylene copolymer is used in other layers of the film in accordance with the invention.

The first layer of the inventive film comprises the above-described propene copolymer and has controllable meat adhesion. The meat adhering attribute of the film may be controlled by the absence, presence, and/or extent of surface energy treatment e.g., by corona discharge.

Films of the present invention that do not have their interior surface layer (first layer) corona treated are expected to have a typical surface energy of at least 29 dynes per cm and typically less than 33. Corona treatment of the first layer can raise the surface energy to levels of at least 33 dynes/cm, preferably at least 34 dynes/cm. Most preferably levels of from about 35 to 38 dynes/cm will be usefully employed to produce films of the invention having high meat adhesion. Films that have high meat adhesion lessen cook-out of meat juices which if not prevented may lead to loss of product weight. Also, cook-out can produce an undesirable package appearance for applications where the processing/packaging film is intended to be left on the product for post-processing sale and use. Inventive films with low meat adhesion find utility in cook and strip applications where the film is typically removed from the encased foodstuff directly after cooking or pasteurization. The product after removal of the film is further processed or repackaged. Low meat adhesion films of the invention typically have a surface energy of less than 33 dynes/cm.

The core layer functions as a controlled gas barrier, and provides the necessary $O_2$ barrier for preservation of the article to be packaged. It should also provide good optical properties when stretch oriented, including low haze and a stretching behavior compatible with the layers around it. It is desirable that the thickness of the core layer be less than about 0.45 mil (10.16 microns) and greater than about 0.05 mil (1.27 microns) to provide the desired combination of the performance properties sought e.g. with respect to oxygen permeability, shrinkage values especially at low temperatures, ease of orientation, delamination resistance, and optical properties. Suitable thicknesses are less than 15%, e.g. from 3 to 13% of the total film thickness. Preferably, the thickness of the core layer will also be less than about 10% of the total thickness of the multilayer film.

The core or barrier layer of this film is a relatively small percentage of total film thickness and is made of polyvinylidene chloride-vinyl chloride copolymer (PVDC or VDC-VC) or vinylidene chloride-methylacrylate copolymer (VDC-MA, or MA-Saran). The core layer preferably comprises MA-Saran, which will control the oxygen permeability of the film. For perishable food packaging, the oxygen ($O_2$) permeability desirably should be minimized. Typical films will have an $O_2$ permeability of less than about 20 $cm^3/m^2$ for a 24 hour period at 1 atmosphere, 0% relative humidity and 23° C., and preferably less than 15 $cm^3/m^2$, more preferably less than 10 $cm^3/m^2$.

The amount of MA-Saran in the core layer may be adjusted by blending in compatible polymers to vary orientation parameters or the gas permeability e.g. $O_2$ of the films of the invention. The thickness of the core layer may also be varied from about 0.05 to about 0.30 mils (1.3–7.62 microns). Also, while it is preferred that the core layer consist essentially of MA-Saran, the present invention recognizes the possibility that up to 20% by weight of other materials may be present, and that other additives including polymers may be blended into the core layer to purposefully affect core layer properties such as gas permeability or moisture resistance in minor amounts.

The second and fourth layers are disposed on either side of the core layer and provide good interlayer adhesion characteristics to the multilayer structure. Either or both of these layers may also contribute to the shrinkability and/or optical properties of the inventive film. The composition of each of the second and fourth layers comprises at least 10% of a first copolymer of ethylene and at least one $C_4$–$C_8$ α-olefin, said copolymer having a density of from 0.900 to 0.915 g/cm³ and a melt index of less than 2 dg/min. This first copolymer is a very low density polyethylene.

The expression very low density polyethylene ("VLDPE") sometimes called ultra low density polyethylene ("ULDPE"), as used herein refers to substantially linear polyethylenes having densities below about 0.915 g/cm³ and, possibly as low as 0.86 g/cm³, and having at least one melting point of at least 90° C. This expression does not include ethylene α-olefin copolymers of densities below about 0.90 g/cm³ with elastomeric properties and referred to as elastomers. Some elastomers are also referred to by at least one manufacturer as "ethylene alpha olefin plastomers," but other manufacturers have characterized VLDPE as an ethylene α-olefin with plastomeric properties. However, as hereinafter explained, ethylene α-olefin elastomers or plastomers may be advantageously used in the practice of this invention as a minor constituent in certain layers of this multilayer film. VLDPE does not include linear low density polyethylenes (LLDPE) which have densities in the range of 0.915–0.930 gm/cm$^3$, but it is contemplated that LLDPE may optionally be blended into one or more of the layers. VLDPE's as the term is used herein may be made by a variety of processes including solution or fluidized bed processes using a variety of catalysts including traditional Ziegler-Natta, single-site constrained geometry or metallocene catalysts.

VLDPE comprises copolymers (including terpolymers) of ethylene with αolefins, usually 1-butene, 1-hexene or 1-octene, and in some instances terpolymers, as for example of ethylene, 1-butene and 1-hexene. A process for making VLDPEs is described in European Patent Document publication number 120, 503 whose text and drawing are hereby incorporated by reference into the present document.

As for example described in Ferguson et al. U.S. Pat. No. 4,640,856 and Lustig et al. U.S. Pat. No. 4,863,769, VLDPEs are capable of use in biaxially oriented films and have superior properties to comparably made films having LLDPEs. These superior properties include higher shrink, higher tensile strength and greater puncture resistance.

Suitable VLDPEs include those manufactured by Dow Chemical Company, Exxon Chemical Company and Union Carbide Corporation.

The composition of each of the second and fourth layers also comprises at least 10% of a second copolymer of ethylene with from 4 to 18% of a vinyl ester, alkyl acrylate, acrylic or methacrylic acid, and, from 0 to 60% of a third copolymer of ethylene and at least one $C_3$–$C_8$ α-olefin having a density less than 0.900 g/cm$^3$ and a melting point less of between 65° C. and 98° C.

The composition of the second layer may be identical or different from that of the fourth layer within the parameters of the above-defined structure. For example the specific first, second and third polymers used may differ from one layer to the other or they may be partially or completely the same or in the same or different amounts. Also, the other ingredients not required by this invention may also be present in one or both layers, and the relative thicknesses of each layer may vary. Beneficially, the second layer will often be thicker than the fourth layer to provide good moisture barrier properties in addition to good shrinkability. The third component is often referred to as a "plastomer."

The first copolymer of either or both of the second and fourth layers may comprise from 10 to 70% of each respective layer. The second copolymer of either or both of the second and fourth layers may comprise from 10 to 40% of each respective layer. The third copolymer of either or both of the second and fourth layers may comprise from 10 to 60% of each respective layer. The fourth copolymer of either or both of the second and fourth layers may comprise at least 10% of each respective layer.

The fourth layer also provides mechanical strength, shrinkability, abrasion resistance and resists burn through during heat sealing. This fourth layer is typically sufficiently thick to provide support, heat shrinkability, and impart strength to the packaging film wall in order to withstand the shrinking operation, handling pressures, abrasion, and packaging with a foodstuff. As an outer surface layer of the film, the fourth layer provides a desirable glossy appearance. Advantageously, the fourth layer comprises at least 30%, preferably at least 40% of a first copolymer of ethylene with a minor proportion of one or more $C_4$–$C_8$ α-olefins, which may provide a water vapor barrier, which resists moisture permeation. High moisture barrier properties are desirable to avoid weight loss and undesirable drying of the enclosed food product. This first copolymer has a density of from 0.900 g/cm$^3$ to 0.915 g/cm$^3$ and a melt index of less than 2 dg/min. and is often termed a VLDPE.

The fourth layer further comprises at least 10 wt. % of a second copolymer of ethylene with from 4 to 18% (based on the weight of the second copolymer) of a vinyl ester, alkyl acrylate, acrylic or methacrylic acid. Preferably, this second copolymer comprises EVA. Optionally, included in this fifth layer is from 0 to 30% of a third copolymer of ethylene and at least one $C_3$–$C_8$ α-olefin having a density less than 0.900 g/cm$^3$ and a melting point of between 65° C. and 98° C. This third copolymer is often termed a "plastomer" and may also have a average molecular weight distribution ($M_w/M_n$) less than 3, e.g. about 2.

Processing aides such as slip agents, anti-block agents and the like may also be incorporated into the fourth layer as well as into other layers. Such processing aids are typically used in amounts less than 10% and preferably less than 5% of the layer weight. A preferred processing aid for use in the outer layer of the film is a fluoroelastomer.

The above ingredients are admixed together and extruded to provide a uniformly blended layer having good strength, processability, high shrinkage characteristics and good optical properties including high gloss. Addition of the third copolymer, in particular, contributions to good optical and shrink properties. Advantageously, the fourth layer may consist essentially of the first and second copolymers with or without the third copolymer and with or without a minor amount (<10%) of processing aid.

In a second embodiment of the invention, a transition layer is provided between and in contact with the first layer and the second layer. This transition layer is a very thin layer of a copolymer comprising materials found in both the first and second layers. The transition layer is preferably between 2% and 10% of the overall thickness of the multilayer film, preferably 3%. The transition layer is believed to aid in the adherence of the first layer to the second layer without the need of using adhesives by virtue of the compatibility of the materials in that layer to the first and second layers.

Accordingly, the transition layer comprises (a) at least 20% by weight of a fourth copolymer of propene, and at least one α-olefin selected from the group consisting of ethylene, butene-1, methylpentene-1, hexene-1, octene-1, decene-1 and mixtures thereof, said copolymer having a propene content of at least 60 wt. %, a Tm between 100° C. and 145° C., a Mw/Mn of between 1 and 5, and n-hexane extractables of less than 5 wt. %, (b) at least 20% by weight of a fifth copolymer of ethylene and at least one $C_4$–$C_8$ α-olefin, said copolymer having a density of from 0.900 to 0.915 g/cm$^3$ and a melt index of less than 1.0 dg/min., and (c) from 0 to 60 wt. % of a sixth copolymer of ethylene and at least one $C_3$–$C_8$ α-olefin having a density less than 0.900 g/cm$^3$ and a melting point less of between 65–98° C. Preferably, the propene copolymer in the first layer and transition layer has a Tm between 110° C. and 130° C., a Mw/Mn of between 1 and 3, and n-hexane extractables of less than 2.6 wt. %.

A third embodiment of the invention does not include a core barrier layer comprising MA-Saran. Instead, in this third embodiment of the invention, a simple multilayer film structure includes an inner heat sealing layer as described above for the first layer, a second layer as described above and an optional exterior protective layer. The optional exterior layer may comprise nylon, or may comprise a material having a composition as defined by the definition of the first layer, although the composition need not be identical to the first layer. A preferred nylon is a nylon 6/66 copolymer having a melting point of about 195° C., which has a reported nylon 6 component content of about 85 mole % and a nylon 66 component content of about 15 mole % and which is commercially available from Allied Chemical Co. of Morristown, N.J., U.S.A. under the trademark CAPRON XTRAFORM.TM. 1539F. This third embodiment of the invention is useful as a cook-in strip pouch for foodstuffs.

The multilayer film of the invention may be made by conventional processes including e.g. slot cast or blown film processes, but preferably will be made by an orientation process, especially under conditions to produce a film which is heat shrinkable at 90° C. or less. Descriptions of suitable orientation processes are disclosed in U.S. Pat. No. 5,759,648 to Idlas, which is hereby incorporated by reference in its entirety. Because the film is heat shrinkable, a shrunk film pouch will advantageously cling to the packaged foodstuff even after opening. Non-shrink bags have a tendency to fall away from the sides of the enclosed product once the vacuum is broken by either intentional or accidental opening. Once the film separates from the enclosed article surface, oxygen comes into contact with the article surface and product defects on susceptible products such as ham may occur. Some prior art films and bags are nonshrink bags which suffer from this defect thereby causing spoilage and waste when used to package perishable foodstuffs.

The four layer film of this invention may be manufactured by coextrusion of all layers simultaneously, for example, as described in U.S. Pat. No. 4,448,792 (Schirmer), or by a coating lamination procedure such as that described in U.S. Pat. No. 3,741,253 (Brax et al.), to form a relatively thick primary multilayer extrudate either as a flat sheet or, preferably, as a tube. This sheet or tube is oriented by stretching at orientation temperatures, which are generally below the melting points for the predominant resin comprising each layer oriented. Stretch orientation may be accomplished by various known methods e.g. tentering which is commonly employed to orient sheets, or by the well-known trapped bubble or double bubble technique for orienting tubes as for example described in U.S. Pat. No. 3,456,044 (Pahlke). In this bubble technique, an extruded primary tube leaving a tubular extrusion die is cooled, collapsed and then preferably oriented by reheating and inflating to form an expanded secondary bubble, which is again cooled and collapsed. Preferred films are biaxially stretched. Transverse direction (TD) orientation is accomplished by the above noted inflation to radially expand the heated film which is cooled to set the film in an expanded form. Machine direction (MD) orientation is preferably accomplished with the use of sets of nip rolls rotating at different speeds to stretch or draw the film tube in the machine direction thereby causing machine direction elongation which is set by cooling. Orientation may be in either or both directions. Preferably, a primary tube is simultaneously biaxially stretched radially (transversely) and longitudinally (machine direction) to produce a multilayer film which is heat shrinkable at temperatures below the melting points of the major polymeric components, e.g. at 90° C. or lower.

Axially stretched, especially biaxially stretched, films which are "heat shrinkable" as that term is used herein have at least 10% unrestrained shrinkage at 90° C. (10% in both the machine direction (M.D.) and transverse direction (T.D.) for biaxially stretched films). According to the present invention one or more of the essential five film layers may be oriented either uniaxially or biaxially by axial stretching at temperatures low enough to produce low temperature, high shrink multilayer films. Such heat shrinkable multilayer films will have at least 10% shrink in at least one direction at 90° C., but preferably will have at least 20% shrink at 90° C. in at least one direction (preferably both directions) and advantageously may have at least 30% shrink at 90° C. in at least one direction, and preferably may have at least 25% in both M.D. and T.D. directions, and beneficially may have at least 10% shrink at 74° C. in both M.D. and T.D. directions and preferably at least 15% (more preferably at least about 20%) in at least one direction at 74° C.

The general annealing process by which biaxially stretched heat shrinkable films are heated under controlled tension to reduce or eliminate shrinkage values is well known in the art. If desired, films of the present invention may be annealed to produce lower shrinkage values as desired for the particular temperature. The stretch ratio during orientation should be sufficient to provide a film with a total thickness of between about 1.0 and 4.0 mils. The MD stretch ratio is typically 2½–6 and the TD stretch ratio is also typically 2½–6. An overall stretch ratio (MD stretch multiplied by TD stretch) of about 6¼×–36×is suitable.

The preferred method for forming the multilayer film is coextrusion of the primary tube which is then biaxially oriented in a manner similar to that broadly described in the aforementioned U.S. Pat. No. 3,456,044 where the primary tube leaving the die is inflated by admission of a volume of air, cooled, collapsed, and then preferably oriented by reinflating to form a secondary tube termed a "bubble" with reheating to the film's orientation (draw) temperature range. Machine direction (MD) orientation is produced by pulling or drawing the film tube e.g. by utilizing a pair of rollers traveling at different speeds and transverse direction (TD) orientation is obtained by radial bubble expansion. The oriented film is set by rapid cooling.

In the following examples, all four layers are coextruded as a primary tube, which is cooled upon exiting the die by spraying with tap water. This primary tube is then reheated by radiant heaters with further heating to the draw temperature (also called the orientation temperature) for biaxial orientation accomplished by an air cushion which is itself heated by transverse flow through a heated porous tube that is concentrically positioned around the moving primary tube. Cooling is accomplished by means of a concentric air ring.

In a preferred process for making films of the present invention, the resins and any additives are introduced to an extruder (generally one extruder per layer) where the resins are melt plastified by heating and then are transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen. However, variations are expected which may depend upon such factors as variation of polymer resin selection, use of other resins e.g. by blending or in separate layers in the multilayer film, the manufacturing process used and particular equipment and other process parameters utilized. Actual process parameters including process temperatures are expected to be set by one skilled in the art without undue experimentation in view of the present disclosure.

As generally recognized in the art, resin properties may be further modified by blending two or more resins together and it is contemplated that various resins may be blended into individual layers of the multilayer film or added as additional layers, such resins include ethylene-unsaturated ester copolymer resins, especially vinyl ester copolymers such as EVAs, or other ester polymers, very low density polyethylene (VLDPE), linear low density polyethylene (LLDPE), low density polyethylene (LDPE), high density polyethylene (HDPE), nylons, ionomers, polypropylenes, or blends thereof. These resins and others may be mixed by well known methods using commercially available tumblers, mixers or blenders. Also, if desired, well known additives such as processing aids, slip agents, antiblocking agents, pigments, etc., and mixtures thereof may be incorporated into the film.

In some preferred embodiments of the invention, it is preferred to crosslink the entire film to broaden the heat sealing range. This is preferably done by irradiation with an electron beam at dosage levels of at least about 2 megarads (MR) and preferably in the range of 3 to 8 MR, although higher dosages may be employed. Irradiation may be done on the primary tube or after biaxial orientation. The latter, called post-irradiation, is preferred and described in U.S. Pat. No. 4,737,391 (Lustig et al.). An advantage of post-irradiation is that a relatively thin film is treated instead of the relatively thick primary tube, thereby reducing the power requirement for a given treatment level.

Alternatively, crosslinking may be achieved by addition of a chemical crosslinking agent or by use of irradiation in combination with a crosslinking enhancer added to one or more of the layers, as for example described in U.S. Pat. No. 4,055,328 (Evert et al.). The most commonly used cross-linking enhancers are organic peroxides such as trimethylpropane and trimethylacrylate.

EXAMPLES

The following are examples and comparative examples given to illustrate the present invention.

Experimental results and reported properties of the following examples are based on the following test methods or substantially similar test methods unless noted otherwise.

Tensile Strength: ASTM D-882, Method A

Percent Elongation: ASTM D-882. Method A

Haze: ASTM D-1003–52

Gloss: ASTM D-2457, 45.degree. angle

1% Secant Modulus: ASTM D-882, Method A

Oxygen Gas Transmission Rate (02 GTR): ASTM D-3985–81

Water Vapor Transmission Rate (WVTR): ASTM F 1249–90

Elmendorf Tear Strength: ASTM D-1992

Gauge: ASTM D-2103

Melt Index: ASTM D-1238, Condition E (190° C.) (except for propene-based (>50% $C_3$ content)polymers tested at Condition TL(230° C.))

Melting point: ASTM D-3418, DSC with 5° C./min heating rate

Surface Energy (Wetting Tension):ASTM D-2578–84

Shrinkage Values: Shrinkage values are defined to be values obtained by measuring unrestrained shrink of a 10 cm square sample immersed in water at 90° C. (or the indicated temperature if different) for five seconds. Four test specimens are cut from a given sample of the film to be tested. The specimens are cut into squares of 10 cm length in the machine direction by 10 cm. length in the transverse direction. Each specimen is completely immersed for 5 seconds in a 90° C. (or the indicated temperature if different) water bath. The specimen is then removed from the bath and the distance between the ends of the shrunken specimen is measured for both the M.D. and T.D. directions. The difference in the measured distance for the shrunken specimen and the original 10 cm. side is multiplied by ten to obtain the percent of shrinkage for the specimen in each direction. The shrinkage of four specimens is averaged for the M.D. shrinkage value of the given film sample, and the shrinkage for the four specimens is averaged for the TD shrinkage value. As used herein the term "heat shrinkable film at 90° C." means a film having an unrestrained shrinkage value of at least 10% in at least one direction.

Shrink Force: The shrink force of a film is that force or stress required to prevent shrinkage of the film and was determined from film samples taken from each film. Four film samples were cut 1" (2.54 cm) wide by 7" (17.8 cm) long in the machine direction and 1" (2.54 cm) wide by 7" (17.8 cm) long in the traverse direction. The average thickness of the film samples was determined and recorded. Each film sample was then secured between the two clamps spaced 10 cm apart. One clamp is in a fixed position and the other is connected to a strain gauge transducer. The secured film sample and clamps were then immersed in a silicone oil bath maintained at a constant, elevated temperature for a period of five seconds. During this time, the force in grams at the elevated temperature was recorded. At the end of this time, the film sample was removed from the bath and allowed to cool to room temperature whereupon the force in grams at room temperature was also recorded. The shrink force for the film sample was then determined from the following equation wherein the results is obtained in grams per mil of film thickness (g/mil):

Shrink Force (g/mil)=F/T wherein F is the force in grams and T is the average thickness of the film samples in mils.

Impulse Seal Range: The impulse sealing range test determines the acceptable voltage ranges for impulse sealing plastic films. A Sentinel Model 12-12AS laboratory sealer manufactured by Packaging Industries Group, Inc., Hyannis Mass., U.S.A. was used. This impulse sealer is equipped with a replacement sealing ribbon for a Multivac AG100 brand packaging machine. The ribbon is available from Koch Supplies of Kansas City, Mo. In this test, two four inch wide (T.D. direction) samples are cut from a tubular film. The impulse sealer is equipped with controls for coolant flow, impulse voltage and time, and seal bar pressure. These controls except for impulse voltage are set at the following conditions: 0.5 seconds impulse time (upper ribbon only), 2.2 seconds cooling time, 50 psi (345 kpa) jaw pressure, 0.3 gallon per minute (1 liter per minute) of cooling (about 75° F. (22° C.)) water flow.

One of the samples is folded in half for use in determining a minimum sealing voltage. This folding simulates folding which may inadvertently occur during conventional bag sealing operations. The folded sample which now has four sheets or portions of film (hereinafter referred to as "sheet portions") is placed into the sealer and by trial and error the minimum voltage to seal the bottom two sheet portions to each other was determined.

The maximum voltage is then determined for a sample having two sheet portions by placing it in the sealer and then activating the seal bar. The film sample is manually pulled with about 0.5 lbs. of force and the voltage which does not cause burn through or significant distortion of the seal is determined.

Seal Strength Test: Five identical samples of film are cut 1 inch (2.54 cm) wide and at least 5 inches (77 cm) long with a 1 inch (2.54 cm) wide seal portion centrally and transversely disposed. Opposing end portions of a film sample are, secured in opposing clamps in a temperature controlled chamber of an Instron 4501 Universal Testing Instrument. The film is secured in a taut snug fit between the clamps without stretching prior to beginning the test. The test chamber door is closed and the chamber is heated to the test temperature at which time the instrument is activated to pull the film via the clamps traverse to the seal at a uniform rate of 5 inches (127 cm) per minute until failure of the film (breakage of film or seal, or delamination and loss of film integrity). The lbs. at break are measured and recorded. The test is repeated for five samples and the average lbs. at break reported.

Unless otherwise indicated, the impulse seals tested for seal strength were made using the equipment described in the impulse seal range test description above with controls similarly set but having a cooling time of about 8 seconds.

The hot bar seals of various tested films were made similar to one another using settings of at 500° F. (260° C.) and 0.5 seconds dwell time.

Seal Creep: The Seal Creep to Failure Test is designed to be an accelerated cook-in simulation to determine resistance to seal failure and/or loss of film integrity of a processing film over time. In the test, five samples of ½ inch (12.7 mm) wide film is cut from one or more similar sealed films with the cuts made perpendicular to the seal so that each film sample contains a ½ inch wide seal and five inches of film on either side of the seal. This produces samples which are each 10 inches (25.4 cm) long by ½ inch (12.7 mm) wide with a seal in the middle. The opposing top and bottom long portions of a film sample containing a centrally disposed seal are securely attached to respective flat plate clamps which extend over the width of the film end. The top film clamp is attached to a fixture while the opposing bottom clamp has an attached weight (for a total weight of about 1 lb. (454 g). The weighted clamp and lower film portion including the seal area are submersed into a circulating bath of temperature controlled water set at 165° F. (74° C.). The film seal area is positioned about 2–3 inches below the surface of the water and the film strip with attached weight is perpendicular to the surface of the water. Upon submersion, a timer is started and the film and weight are observed and the time noted at which the weight drops signifying film seal failure and/or loss of film integrity. The film and weight are observed continuously for the first fifteen minutes and then checked at least every 15 minutes thereafter up to a total test period of 180 minutes. The average for five test samples is reported. Minimum and maximum values measured for the set may also be reported.

Following are examples and comparative examples given to illustrate the invention.

In all the following examples, unless otherwise indicated, the film compositions are produced generally utilizing the apparatus and method described in U.S. Pat. No. 3,456,044 (Pahlke), which describes a coextrusion type of double bubble method, and in further accordance with the detailed description above. All percentages are by weight unless indicated otherwise.

Multilayer layer tubular films are made by a biaxial stretching orientation process. However, films of five or more layers are also contemplated by the present invention. The inventive multilayer films may include additional layers or polymers to add or modify various properties of the desired film such as heat sealability, interlayer adhesion, food surface adhesion, shrinkability, shrink force, wrinkle resistance, puncture resistance, printability, toughness, gas or water barrier properties, abrasion resistance and optical properties such as gloss, haze, freedom from lines, streaks or gels. These layers may be formed by any suitable method including coextrusion, extrusion coating and lamination.

EXAMPLE 1

100% $C_3C_2$/60% VLDPE: 25% EVA: 15% Plastomer/ 85% MA-Saran blend/55.6% VLDPE: 25% EVA: 15% Plastomer: 4.4% Processing Aid The first layer (which is the interior surface of the tubular film) comprises a random copolymer of propene and ethene that is made using a metallocene catalyst, such as 3.4 wt % $C_2$ propylene copolymer made by EXXPOL™ technology by Exxon Chemicals, Houston, Tex., U.S.A. This copolymer reportedly has a melt flow index of 4.0 dg/min., a Tm of 127° C., a hexane extractables of 1.4% and a Mw/Mn less than 5.

The second and fourth layer (the fourth layer being the exterior surface of the tube) contain an ethylene-α-olefin copolymer of very low density polyethylene sold by Dow Chemical Company of Midland, Mich., U.S.A. under the trademark Attane XU 61509.32, which is a copolymer of ethylene and octene-1 reportedly having a melt index of about 0.5 dg/min and a density of about 0.912 g/cm$^3$, with a Vicat softening point of 95° C. and a melting point of about 122° C. Also, the second and fourth layers contain a copolymer of ethylene and vinyl acetate (EVA) as a component of the blend of resins. This EVA is available from Exxon Chemical Company of Houston Tex., U.S.A. under the trademark Escorene LD 701.06 and has the following reported properties: 10.5% vinyl acetate content; 0.93 g/cm$^3$ density; 0.19 dg/min. melt index; and a melting point of about 97° C. In addition, the second and fourth layers include a resin designated as "Plastomer." This plastomer resin is a copolymer of ethylene and at least one $C_3$–$C_8$ α-olefin having a density less than 0.900 g/cm$^3$ and a melting point less than 85° C. In particular, the plastomer resin is a commercially available copolymer predominantly of ethylene copolymer with butene-1 monomer and component having a reported density of about 0.885 g/cm$^3$, a melt index of 0.5 dg/min and a melting point of 68° C. and is available under the trademark Tafiner A0585X from Mitsui Petrochemical Industries, Ltd. of Tokyo, Japan.

The fourth (outer) layer also includes 4.4% by weight of a slip processing aid sold under the trademark Ampacet 100031 by Ampacet Corp. of Tarrytown, N.Y., U.S.A.

The core layer comprises a 5.5:1 blend of vinylidene chloride-methylacrylate copolymer (vdc-ma or MA-Saran) and vinylidene chloride-vinyl chloride copolymer (vdc-vc). This layer is referred to as an 85% MA-Saran blend. Minor amounts of plasticizing, lubricant and/or colorant additives such as ultramarine blue pigment may also be used. For this and other examples, a preferred blend of vinylidene chloride-methylacrylate copolymer (vdc-ma) and vinylidene chloride-vinyl chloride copolymer (vdc-vc) is disclosed in U.S. Pat. No. 4,798,751 which patent is hereby incorporated by reference in its entirety.

One extruder is used for each layer and the heat plastified resins from each extruder are introduced to a 5-layer spiral plate coextrusion die from which the resins were coextruded at an first/second/third/fourth/fifth layer outlet thickness ratio of about 16:43:11:9:21. To make a four layer film with a five layer die, the same resin to make the fourth layer is extruded simultaneously from both the fourth and fifth outlets. Accordingly, the four layer film has a thickness ratio of about 16:43:11:30.

For each layer, the resin or resin mixture is fed from a hopper into an attached single screw extruder where the resin and/or mixture is heat plastified and extruded through a five layer coextrusion spiral plate die into a primary tube. The extruder barrel temperatures for the third (core) layer is about 350°–400° F. (177°–204° C.); for the first (inner)and second (intermediate) layer is about 300° F. (149° C.); and for the fourth (outer) layer is about 330°–340° F. (166°–171° C.). The extrusion die has an annular exit opening of 3-inch diameter with a 0.060 inch gap (7.62 cm×0.152 cm). The coextrusion die temperature profile is set from about 340° F. to 410° F. (171°–210° C.). The extruded multilayer primary tube is cooled by spraying with cold tap water (about 7°–14° C.).

The cooled primary tube is flattened by passage through a pair of nip rollers whose speed is controlled to neck down the primary tube to adjust the tube circumference or flat-width. A flattened tube of about 4-⅛ inches (10.5 cm) flatwidth is preferred. The cooled flattened primary tube is reheated, biaxially stretched, and cooled.

The cooled film is flattened, and the biaxially stretched and biaxially oriented film is wound on a reel. The machine direction (M.D.) draw or orientation ratio is about 3.7:1 to 3.8:1 and the transverse direction (T.D.) bubble or orientation ratio is about 2.8:1 to 2.9:1. The draw point or orientation temperature is below the predominant melting point for each layer oriented and above that layer's glass transition point. Draw point temperature, bubble heating and cooling rates and orientation ratios are generally adjusted to maximize bubble stability and throughput for the desired amount of stretching or orientation. The resultant film of Example 1 has an average gauge of 2.5 to 2.7 mils.

EXAMPLE 2

100% $C_3C_2$/60% $C_3C_2$: 25% VLDPE: 15% Plastomer/60% VLDPE: 25% EVA: 15% Plastomer/85% MA-Saran blend/55.6% VLDPE: 25% EVA: 15% Plastomer: 4.4% Processing Aid Example 2 is prepared by the same process as Example 1, except that a transition layer of material is coextruded between the first and second layers to provide a five layer film having the a thickness ratio of about 16:3:40:11:30. The resultant film of Example 2 has an average gauge of 2.5 mils. This film is further processed by irradiating irradiated by electron beam to a level of about 4 Mrad.

The first, second, third and fourth layers contain the same materials as Example 1. The transition layer includes the propylene copolymer material in the first layer and the VLDPE and Plastomer in the second layer.

EXAMPLE 3

100% $C_3C_2$/60% VLDPE: 25% EVA: 15% Plastomer/100% Nylon

The film of Example 3 is prepared by the same process as Example 1, except that a three layer film structure is coextruded in a thickness ratio of about 20:40:20. The resultant film of Example 3 has an average gauge of 2.5 mils.

The materials are as above except that the nylon is a commercially available nylon 6/66 copolymer sold by Allied Chemical Company under the trademark CAPRON XTRAFORM 1539F. This nylon has a reported nylon 6 content of 85 mole % and nylon 66 content of 15 mole % with a DSC melting point of about 195° C., and a density of 1.13 g/cm³.

EXAMPLE 4

100% $C_3C_2$/60% VLDPE: 25% EVA: 15% Plastomer/100% $C_3C_2$.

The film of Example 4 is prepared by the same processes Example 3, except that the nylon outer layer is replaced with the metallocene catalyzed propylene copolymer material used in the first layer. This film structure is useful in that a bag with a fold over seal may be made and the outer surface heat sealed to the inner surface.

Comparative Example 1:

As noted above, one of the advantages of metallocene catalyzed propylene copolymers is the combination of low extractables with a low melting temperature. The low melting point allows for an increase in the shrink properties of the film structure. To demonstrate the increase in shrink associated with propylene copolymers of lower melting point, and thereby the advantage of using metallocene catalyzed propylene copolymers, the following series of experiments were conducted.

A two-layer film structure was prepared following the procedure of Example 3 above, except that an outer protective layer was not used. The inner heat sealing first layer comprised about 10% of the overall film thickness. The same material as described for the second layer in Example 3 was used for the second layer in the comparative examples. A series of ZN catalyzed propylene copolymers were used for the inner heat sealing first layer in the two-layer films, as follows:

Film A: $C_3-C_2$ (Eltex™ P KS-409) with a Tm of about 133° C. (from Solvay & Cie, Brussels, Belgium), Film B: $C_3-C_4$ (Cefor™ SRD4–131) with a Tm of about 144° C. (from Shell Chemical Co., Houston, Tex., USA), Film C: $C_3-C_4$ (Cefor™ SRD4–141) with a Tm of about 131° C., Film D: $C_3-C_2$ (Escorene™ PD9272) with a Tm of about 134° C. (from Exxon Chemical Co., Houston, Tex., USA), and Film E: $C_3-C_2$ (Rexene 23R2A) with a Tm of about 148° C. (from Rexene Corp., Dallas Tex., USA. 23R2A is notable for having very low hexane extractables).

The resultant films had an average film thickness gauge of about 2.5 mils. Upon immersion in a hot water bath, the different films exhibited an increase in shrinkage generally corresponding to the relative reduction in melting points of the particular propylene copolymer used in the inner heat sealing layer, as follows:

Film A: MD shrinkage 30%, TD shrinkage 44%

Film B: MD shrinkage 28%, TD shrinkage 41%

Film C: MD shrinkage 32%, TD shrinkage 47%

Film D: MD shrinkage 32%, TD shrinkage 48%

Film E: MD shrinkage 30%, TD shrinkage 41%

From this series of comparative examples, one skilled in the art can appreciate that a metallocene catalyzed propylene copolymer having a lower melting point, such as the EXXPOL $C_3C_2$ (3.4 wt. % $C_2$) described in Examples 1–4, which has a melting point of about 127° C., is expected to produce films having increased shrinkage and lower hexane extractables.

Films, bags and packages of the present invention may also employ combinations of characteristics as described in one or more of the claims including dependent claims which follow this specification and where not mutually exclusive, the characteristics and limitations of each claim may be combined with characteristics or limitations of any of the other claims to further describe the invention.

The above examples serve only to illustrate the invention and its advantages, and they should not be interpreted as limiting since further modifications of the disclosed invention will be apparent to those skilled in the art in view of this teaching. All such modifications are deemed to be within the scope of the invention as defined by the following claims.

I claim:

1. A multilayer packaging film formable into a pouch by heat sealing for use in food preparation consisting essentially of:
   (1) an inner sealing layer comprising at least 50% by weight of a copolymer of propene, and at least one α-olefin selected from the group consisting of ethylene, butene-1, methylpentene-1, hexene-1, octene-1, decene-1 and mixtures thereof, said copolymer having a propene content of at least 60 wt. %, a Tm between about 100° C. and about 145° C., a: Mw/Mn of between 1 and 5, and n-hexane extractables of less than 5 wt. %;
   (2) a second layer in contact with the inner sealing layer comprising:
      (a) at least 10 wt. % of a first copolymer of ethylene and at least one $C_4$–$C_8$ α-olefin, said copolymer having a density of from 0.900 to 0.915 g/cm$^3$ and a melt index of less than 2 dg/min.,
      (b) at least 10 wt. % of a second copolymer of ethylene with from 4 to 18 wt. % of a vinyl ester, alkyl acrylate, acrylic or methacrylic acid, and
      (c) from 0 to 60 wt. % of a third copolymer of ethylene and at least one $C_3$–$C_8$ α-olefin having a density less than 0.900 g/cm$^3$ and a melting point of between 65–98° C.; and
   (3) an optional third layer comprising a protective outer layer.

2. The film of claim 1 wherein the third layer comprises nylon.

3. The film of claim 1 wherein the third layer comprises at least 50% by weight of a copolymer of propene, and at least one α-olefin selected from the group consisting of ethylene, butene-1, methylpentene-1, hexene-1, octene-1, decene-1 and mixtures thereof, said copolymer having a propene content of at least 60 wt. %, a Tm between about 100° C. and about 145° C., a Mw/Mn of between 1 and 5, and n-hexane extractables of less than 5 wt. %.

4. The film of claim 1 wherein in the copolymer of the inner sealing layer the Tm is between about 110° C. and 130° C.

5. The film of claim 1 wherein in the copolymer of the inner sealing layer the Tm is between about 120° C. and 130° C.

6. The film of claim 1 wherein in the copolymer of the inner sealing layer the n-hexane extractables are less than 4 wt. %.

7. The film of claim 1 wherein in the copolymer of the inner sealing layer the n-hexane extractables are less than 2.6 wt. %.

8. The film of claim 1 wherein in the copolymer of the inner sealing layer the n-hexane extractables are less than 2 wt. %.

9. The film of claim 1 wherein in the copolymer of the inner sealing layer the n-hexane extractables are less than 1 wt. %.

10. The film of claim 1 wherein in the copolymer of the inner sealing layer the Mw/Mn is less than 3.

11. The film of claim 1 wherein in the copolymer of the inner sealing layer the Mw/Mn is between 1.5 and 2.5.

12. The film of claim 1 wherein in the copolymer of the inner sealing layer the Mw/Mn is less than 3 and the n-hexane extractables are less than 2.6 wt. %.

13. The film of claim 1 wherein in the copolymer of the inner sealing layer the Tm is between about 110° C. and 130° C., and the n-hexane extractables are less than 2.6 wt. %.

14. The film of claim 1 wherein in the copolymer of the inner sealing layer the Tm is between about 110° C. and 130° C., and the Mw/Mn is less than 3.

15. The film of claim 1 wherein in the copolymer of the inner sealing layer the Tm is between about 110° C. and 130° C., the Mw/Mn is less than 3 and the n-hexane extractables are less than 2.6 wt. %.

16. The film of claim 15 wherein in the copolymer of the inner sealing layer the Mw/Mn is between 1.5 and 2.5.

17. The film of claim 15 wherein in the copolymer of the inner sealing layer the n-hexane extractables are less than 2 wt. %.

18. The film of claim 15 wherein in the copolymer of the inner sealing layer the n-hexane extractables are less than 1 wt. %.

19. The film of claim 3 wherein in the copolymers of the inner sealing layer and the outer layer the Tm is between about 110° C. and 130° C.

20. The film of claim 3 wherein in the copolymers of the inner sealing layer and the outer layer the Tm is between about 120° C. and 130° C.

21. The film of claim 3 wherein in the copolymers of the inner sealing layer and the outer layer the n-hexane extractables are less than 4 wt. %.

22. The film of claim 3 wherein in the copolymers of the inner sealing layer and the outer layer the n-hexane extractables are less than 2.6 wt. %.

23. The film of claim 3 wherein in the copolymers of the inner sealing layer and the outer layer the n-hexane extractables are less than 2 wt. %.

24. The film of claim 3 wherein in the copolymers of the inner sealing layer and the outer layer the n-hexane extractables are less than 1 wt. %.

25. The film of claim 3 wherein in the copolymers of the inner sealing layer and the outer layer the Mw/Mn is less than 3.

26. The film of claim 3 wherein in the copolymers of the inner sealing layer and the outer layer the Mw/Mn is between 1.5 and 2.5.

27. The film of claim 3 wherein in the copolymers of the inner sealing layer and the outer layer the Mw/Mn is less than 3 and the n-hexane extractables are less than 2.6 wt. %.

28. The film of claim 3 wherein in the copolymers of the inner sealing layer and the outer layer the Tm is between about 110° C. and 130° C., and the n-hexane extractables are less than 2.6 wt. %.

29. The film of claim 3 wherein in the copolymers of the inner sealing layer and the outer layer the Tm is between about 110° C. and 130° C., and the Mw/Mn is less than 3.

30. The film of claim 3 wherein in the copolymers of the inner sealing layer and the outer layer the Tm is between about 110° C. and 130° C., the Mw/Mn is less than 3 and the n-hexane extractables are less than 2.6 wt. %.

31. The film of claim 30 wherein in the copolymers of the inner sealing layer and the outer layer the Mw/Mn is between 1.5 and 2.5.

32. The film of claim 30 wherein in the copolymers of the inner sealing layer and the outer layer the n-hexane extractables are less than 2 wt. %.

33. The film of claim 30 wherein in the copolymers of the inner sealing layer and the outer layer the n-hexane extractables are less than 1 wt. %.

34. The film of claim 1, wherein the film has a shrinkage of more than 20% at 90° C. in at least one direction.

35. The film of claim 1, wherein the film has a shrinkage of more than 30% at 90° C. in at least one direction.

36. The film of claim 1, wherein the film has a shrinkage of more than 25% at 90° C. in both directions.

37. The film of claim 1 wherein the film has a shrinkage of more than 30% at 90° C. in a first direction and a shrinkage of more than 44% at 90° C. in a second direction.

38. The film of claim 1, wherein the film has a shrinkage of more than 32% at 90° C. in a first direction and a shrinkage of more than 48% at 90° C. in a second direction.

39. The film of claim 1, wherein the film excludes a core oxygen barrier layer.

40. A multilayer packaging film having at least four layers arranged in sequence comprising:
(1) a first layer comprising at least 50% by weight of a copolymer of propene, and at least one α-olefin selected from the group consisting of ethylene, butene-1, methylpentene-1, hexene-1, octene-1, decene-1 and mixtures thereof, said copolymer having a propene content of at least 60 wt. %, a Tm between about 100° C. and about 145° C., a Mw/Mn of between 1 and 5, and n-hexane extractables of less than 5 wt. %;
(2) second and fourth layers each comprising:
 (a) at least 10 wt. % of a first copolymer of ethylene and at least one $C_4$–$C_8$ α-olefin, said copolymer having a density of from 0.900 to 0.915 g/cm$^3$ and a melt index of less than 2 dg/min.,
 (b) at least 10 wt. % of a second copolymer of ethylene with from 4 to 18 wt. % of a vinyl ester, alkyl acrylate, acrylic or methacrylic acid, and
 (c) from 0 to 60 wt. % of a third copolymer of ethylene and at least one $C_3$–$C_8$ α-olefin having a density less than 0.900 cm$^3$ and a melting point of between 65–98° C.; and
(3) a third layer comprising at least 80% by weight of at least one copolymer of vinylidene chloride with from 2–20 wt. %, based on said copolymer, of vinyl chloride or methyl acrylate.

41. The film of claim 40 wherein the first layer comprises a propylene-ethylene copolymer.

42. The film of claim 40 wherein the first layer comprises at least 75% by weight propylene-ethylene copolymer.

43. The film of claim 40 wherein said propene content of the first layer copolymer is at least 80% based on the weight of the copolymer.

44. The film of claim 40 wherein said propene content of the first layer copolymer is at least 90% based on the weight of the copolymer.

45. The film of claim 40 wherein the first layer consists essentially of propylene-ethylene copolymer.

46. The film of claim 40 wherein in the copolymer of the first layer the Tm is between about 110° C. and 130° C.

47. The film of claim 40 wherein in the copolymer of the first layer the Tm is between about 120° C. and 130° C.

48. The film of claim 40 wherein in the copolymer of the first layer the n-hexane extractables are less than 4 wt. %.

49. The film of claim 40 wherein in the copolymer of the first layer the n-hexane extractables are less than 2.6 wt. %.

50. The film of claim 40 wherein in the copolymer of the first layer the n-hexane extractables are less than 2 wt. %.

51. The film of claim 40 wherein in the copolymer of the first layer the n-hexane extractables are less than 1 wt. %.

52. The film of claim 40 wherein in the copolymer of the first layer the Mw/Mn is less than 3.

53. The film of claim 40 wherein in the copolymer of the first layer the Mw/Mn is between 1.5 and 2.5.

54. The film of claim 40 wherein in the copolymer of the first layer the Mw/Mn is less than 3 and the n-hexane extractables are less than 2.6 wt. %.

55. The film of claim 40 wherein in the copolymer of the first layer the Tm is between about 110° C. and 130° C., and the n-hexane extractables are less than 2.6 wt. %.

56. The film of claim 40 wherein in the copolymer of the first layer the Tm is between about 110° C. and 130° C., and the Mw/Mn is less than 3.

57. The film of claim 40 wherein in the copolymer of the first layer the Tm is between about 110° C. and 130° C., the Mw/Mn is less than 3 and the n-hexane extractables are less than 2.6 wt. %.

58. The film of claim 57 wherein in the copolymer of the first layer the Mw/Mn is between 1.5 and 2.5.

59. The film of claim 57 wherein in the copolymer of the first layer the n-hexane extractables are less than 2 wt. %.

60. The film of claim 57 wherein in the copolymer of the first layer the n-hexane extractables are less than 1 wt. %.

61. The film of claim 40 wherein the film has a shrinkage of more than 20% at 90° C. in at least one direction.

62. The film of claim 40 wherein the film has a shrinkage of more than 30% at 90° C. in at least one direction.

63. The film of claim 40 wherein the film has a shrinkage of more than 25% at 90° C. in both directions.

64. The film of claim 40, wherein the film has a shrinkage of more than 30% at 90° C. in a first direction and a shrinkage of more than 44% at 90° C. in a second direction.

65. The film of claim 40 wherein the film has a shrinkage of more than 32% at 90° C. in a first direction and a shrinkage of more than 48% at 90° C. in a second direction.

66. The film of claim 40, wherein the film consists essentially of four layers.

67. The film of claim 40, wherein the four layers are in said sequence and in contact.

68. A multilayer biaxially oriented heat-shrinkable packaging film comprising:
(1) a first layer comprising at least 50% by weight of a copolymer of propene, and at least one α-olefin selected from the group consisting of ethylene, butene-1, methylpentene-1, hexene-1, octene-1, decene-1 and mixtures thereof, said copolymer having a propene content of at least 60 wt. %, a Tm between about 100° C. and about 145° C., a Mw/Mn of between 1 and 5, and n-hexane extractables of less than 4 wt. %;
(2) a second layer comprising:
 (a) at least 10 wt. % of a first copolymer of ethylene and at least one $C_4$–$C_8$ α-olefin, said copolymer having a density of from 0.900 to 0.915 g/cm$^3$ and a melt index of less than 2 dg/min.,
 (b) at least 10 wt. % of a second copolymer of ethylene with from 4 to 18 wt. % of a vinyl ester, alkyl acrylate, acrylic or methacrylic acid, and
 (c) from 0 to 60 wt. % of a third copolymer of ethylene and at least one $C_3$–$C_8$ α-olefin having a density less than 0.900 g/cm$^3$ and a melting point of between 85–98° C.; and
(3) a transition layer between and in contact with said first layer and said second layer, the transition layer comprising:
 (a) at least 20% by weight of a fourth copolymer of propene, and at least one α-olefin selected from the group consisting of ethylene, butene-1, methylpentene-1, hexene-1, octene-1, decene-1 and mixtures thereof, said copolymer having a propene content of at least 60 wt. %, a Tm between 100° C. and 145° C., a Mw/Mn of between 1 and 5, and n-hexane extractables of less than 4 wt. %;
 (b) at least 20% by weight of a fifth copolymer of ethylene and at least one $C_4$–$C_8$ α-olefin, said copolymer having a density of from 0.900 to 0.915 g/cm$^3$ and a melt index of less than 2 dg/min., and (c) from 0 to 60 wt. % of a sixth copolymer of ethylene and at least one C$_3$–C$_8$ α-olefin having a density less than 0.900 g/cm$^3$ and a melting point of between 65–98° C.

(4) a third layer that is a moisture barrier layer comprising at least 80% by weight of at least one copolymer of vinylidene chloride with from 2–20 wt. %, based on said copolymer, of vinyl chloride or methyl acrylate.

69. The film of claim 68 wherein the transition layer comprises at least 50 wt. % of either the fourth copolymer or the fifth copolymer.

70. The film of claim 68 wherein the transition layer comprises about 3% of the total thickness of the film.

71. The film of claim 68 wherein the first layer comprises a propylene-ethylene copolymer.

72. The film of claim 68 wherein the first layer comprises at least 75% by weight propylene-ethylene copolymer.

73. The film of claim 68 wherein said propene content of the first layer copolymer is at least 80% based on the weight of the copolymer.

74. The film of claim 68 wherein said propene content of the first layer copolymer is at least 90% based on the weight of the copolymer.

75. The film of claim 68 wherein the first layer consists essentially of propylene-ethylene copolymer.

76. The film of claim 68 wherein in the copolymer of the first layer the Tm is about 100° C. and 130° C.

77. The film of claim 68 wherein in the copolymer of the first layer the Tm is between about 120° C. and 130° C.

78. The film of claim 68 wherein in the copolymer of the first layer the n-hexane extractables are less than 4 wt. %.

79. The film of claim 68 wherein in the copolymer of the first layer the n-hexane extractables are less than 2.6 wt. %.

80. The film of claim 68 wherein in the copolymer of the first layer the n-hexane extractables are less than 2 wt. %.

81. The film of claim 68 wherein in the copolymer of the first layer the n-hexane extractables are less than 1 wt. %.

82. The film of claim 68 wherein in the copolymer of the first layer the Mw/Mn is less than 3.

83. The film of claim 68 wherein in the copolymer of the first layer the Mw/Mn is between 1.5 and 2.5.

84. The film of claim 68 wherein in the copolymer of the first layer the Mw/Mn is less than 3 and the n-hexane extractables are less than 2.6 wt. %.

85. The film of claim 68 wherein in the copolymer of the first layer the Tm is between about 110° C. and 130° C., and the n-hexane extractables are less than 2.6; wt. %.

86. The film of claim 68 wherein in the copolymer of the first layer the Tm is between about 110° C. and 130° C., and the Mw/Mn is less than 3.

87. The film of claim 68 wherein in the copolymer of the first layer the Tm is between about 110° C. and 130° C., the Mw/Mn is less than 3 and the n-hexane extractables are less than 2.6 wt. %.

88. The film of claim 87 wherein in the copolymer of the first layer the Mw/Mn is between 1.5 and 2.5.

89. The film of claim 87 wherein in the copolymer of the first layer the n-hexane extractables are less than 2 wt. %.

90. The film of claim 87 wherein in the copolymer of the first layer-the n-hexane extractables are less than 1 wt. %.

91. The film of claim 68 further comprising:

a fourth layer comprising:

(a) at least 10 wt. % of a seventh copolymer of ethylene and at least one C$_4$–C$_8$ α-olefin, said copolymer having a density of from 0.900 to 0.915 g/cm$^3$ and a melt index of less than 2 dg/min., (b) at least 10 wt. % of a eighth copolymer of ethylene with from 4 to 18 wt. % of a vinyl ester, alkyl acrylate, acrylic or methacrylic acid, and (c) from 0 to 60 wt. % of a ninth copolymer of ethylene and at least one C$_3$–C$_8$ α-olefin having a density less than 0.900 g/cm$^3$ and a melting point of between 65–98° C.

92. The film of claim 91, wherein the film consists essentially of said layers.

93. The film of claim 68, wherein the film has a shrinkage of more than 20% at 90° C. in at least one direction.

94. The film of claim 68, wherein the film has a shrinkage of more than 30% at 90° C. in at least one direction.

95. The film of claim 68, wherein the film has a shrinkage of more than 25% at 90° C. in both directions.

96. The film of claim 68, wherein the film has a shrinkage of more than 30% at 90° C. in a first direction and a shrinkage of more than 44% at 90° C. in a second direction.

97. The film of claim 68, wherein the film has a shrinkage of more than 32% at 90° C. in a first direction and a shrinkage of more than 48% at 90° C. in a second direction.

* * * * *

UNITED STATES PATENT AND TRADEMARK OFFICE
CERTIFICATE OF CORRECTION

PATENT NO. : 6,869,686 B1
DATED : March 22, 2005
INVENTOR(S) : Scott A. Idlas

It is certified that error appears in the above-identified patent and that said Letters Patent is hereby corrected as shown below:

Column 7,
Line 13, after "cook-in" delete "harris." and substitute -- hams. -- in its place.

Column 9,
Line 18, before "surface)" delete "pg".

Column 23,
Line 17, delete "a: Mw/Mn" and substitute -- a Mw/Mn -- in its place.

Column 28,
Line 16, delete "layer-the" and substitute -- layer the -- in its place.

Signed and Sealed this

Thirteenth Day of September, 2005

JON W. DUDAS
*Director of the United States Patent and Trademark Office*